United States Patent
Corn et al.

(10) Patent No.: US 7,517,220 B2
(45) Date of Patent: *Apr. 14, 2009

(54) SYSTEM AND METHOD FOR PROVIDING EDUCATIONAL CONTENT OVER A NETWORK

(75) Inventors: Stephen B. Corn, Sharon, MA (US); Scott Segal, Chestnut Hill, MA (US)

(73) Assignee: QD Enterprises, LLC, Sharon, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/247,957

(22) Filed: Oct. 11, 2005

(65) Prior Publication Data

US 2006/0105314 A1    May 18, 2006

Related U.S. Application Data

(63) Continuation of application No. 09/835,046, filed on Apr. 13, 2001, now Pat. No. 6,987,945.

(60) Provisional application No. 60/197,313, filed on Apr. 14, 2000.

(51) Int. Cl.
    *G09B 3/00*    (2006.01)
(52) U.S. Cl. ................................ 434/322; 434/350
(58) Field of Classification Search .............. 434/322, 434/350
    See application file for complete search history.

(56) References Cited

U.S. PATENT DOCUMENTS

| | | | | |
|---|---|---|---|---|
| 5,907,831 A | * | 5/1999 | Lotvin et al. | ............... 705/14 |
| 5,944,530 A | * | 8/1999 | Ho et al. | ................ 434/236 |
| 6,112,049 A | * | 8/2000 | Sonnenfeld | ............. 434/350 |
| 6,293,801 B1 | | 9/2001 | Jenkins et al. | |
| 6,615,020 B2 | * | 9/2003 | Richter et al. | ............ 434/350 |
| 6,678,824 B1 | * | 1/2004 | Cannon et al. | ............. 726/22 |
| 6,987,945 B2 | | 1/2006 | Corn et al. | |
| 7,063,536 B1 | * | 6/2006 | Fustolo | ................. 434/323 |

OTHER PUBLICATIONS

Johnson, W.L. et al. "Using Agents to Overcome Deficiencies in Web-Based Courseware" AI-ED '97 Workshop on Intelligent Educational Systems on the World Wide Web, Aug. 19-22, 1997; pp. 1-8. Retrieved from the Internet <http://www.isi.edu/isd/ADE/Promo/PromoHome.html> on Feb. 4, 2002.

(Continued)

*Primary Examiner*—Cameron Saadat
(74) *Attorney, Agent, or Firm*—Lahive & Cockfield, LLP; Anthony A. Laurentano; John S. Curran

(57) ABSTRACT

A method of distributing educational content over a network is disclosed. Educational content is divided into topics and the topics are split into smaller educational units. Professionals reviewing the material for accreditation purposes choose particular units to study and are subject to minimum and maximum time parameters. The partitioning of educational topics allows advertisers to deliver episodic advertising over an extended time period.

19 Claims, 6 Drawing Sheets

OTHER PUBLICATIONS

Moser, M. "Web Based Training Systems and Document Annotation—Implementations for Hyperwave. Chapter 4: Web Based Training Systems" M.SC. Thesis in Telematics. Graz University of Technology;pp. I-IV, 1, 41-61 (Nov. 1998). Retrieved from the Internet: <http://www.iicm.edu/research/diploma> on Jan. 22, 2002.

Muramatsu, B.G. "The Design, Development, and Assessment of the Vibrating Beam Experiment Multimedia Instructional Courseware—Chapter 4. Analysis of Courseware Usage" M.SC. Thesis, University of California at Berkeley; pp. 1-7 (1995). Retrieved from the Internet <http://bits.me.berkeley.edu/{mura/Thesis> on Jan. 22, 2002.

Wang, T. et al. "The Modular Training System (MTS). A System Architecture for Internet-Based Learning and Training" *Proceedings. International Conference on Virtual Systems and Multimedia, VSMM '97 (CAT. No. 97100182)*. Geneva, Switzerland, Sep. 10-12, 1997; IEEE Comput. Soc., Los Alamitos, CA, USA: pp. 166-173 (1997).

Yuan, L. et al. "Self-Guided Multimedia Courseware System over the Internet" Engineering Solutions for the Next Millennium. Proceedings of the 1999 IEEE Canadian Conference on Electrical and Computer Engineering, Shaw Conference Center, Edmonton, Alberta, Canada May 9-12, 1999 (CAT. No. 99TH8411); IEEE, Piscataway, NJ, USA: vol. 3, pp. 1535-1540 (1999).

* cited by examiner

TheAnswerPage
Learn something everyday

| HOME | QUESTION OF THE DAY | REGISTER | CME | CAREERS | REVIEWS | CONTACT US |

TODAY ♦ SEARCH ARCHIVES ♦ SYLLABUS ♦ PALM/PRINTER FRIENDLY

REACH YOUR TARGET EVERY DAY

Answer
of the day.

TheAnswerPage/Pain
Wednesday
April 11, 2001
This week:
Headache

CME Users Login Here:
Username:
[_____] ⟵ 85
Password:
[_____] ⟵ 85
[Logout] ⟵ 86

Page a Pal:
Click Here to enter a colleague's name and email address and we will send this question to your friend.

Click HERE to go BACK to the QUESTION of the Day.

*What is a cluster headache?*

Cluster headaches are defined by the International Association of the Study for Pain as an unilateral attack of pain in the head or neck recurring in separate incidents with daily or almost daily attacks for weeks to months at a time (1). It is usually associated with ipsilateral tearing, rhinorrhea, conjunctival redness, photophobia, and nasal stuffiness and photophobia. Occasionally, patients have ipsilateral miosis or ptosis.

The pain is described as being excruciating and severe. It is usually constant, throbbing and even burning in nature. Patients often can't stay in one place and are "pacing the floor" or "banging their head on the wall" during an attack. They never seem to lay down due to the constant nature of the pain and the lack of relief from being recumbent.

The most common site of the pain is ocular, frontal or temporal. The pain is also the worst in the ocular or periocular area. The pain can also occur much less frequently in the infraorbital area, the ipsilateral upper teeth, the occipital area, or the neck and shoulder.

*What is the typical "cluster period?"*

Cluster headaches are clustered in periods of several weeks to months. The most common periods last 4-12 weeks, but they range from 1 to 52 weeks. The typical patient has one cluster period every 6-18 months. Each cluster usually involves 1-3 attacks lasting from 30-120 minutes during each day of the cluster period. Attacks can skip a day or two during the cluster period. Again typically, the attacks occur during the night.

*During a cluster period, does the pain switch sides or remain only on*

*Fig. 6*

SYSTEM AND METHOD FOR PROVIDING EDUCATIONAL CONTENT OVER A NETWORK

RELATED APPLICATIONS

This application is a continuation of U.S. patent application Ser. No. 09/835,046 filed on Apr. 13, 2001, which claims the benefit of U.S. Patent Application Ser. No. 60/197,313, filed Apr. 14, 2000, entitled "A System And Method For Providing Educational Content Over A Network", the contents of which are herein incorporated by reference.

TECHNICAL FIELD

The present invention relates generally to systems and methods for conveying educational information and more particularly to a system and method for producing, publishing, and disseminating educational material for use by doctors, nurses, pharmacists, allied healthcare professionals and other professionals and students, both those in training and in practice.

BACKGROUND OF THE INVENTION

Many professionals today are required and/or encouraged to receive continuing education in their particular field or discipline. Conventionally, this has been accomplished through the use of professional seminars and/or home study materials. Some professions, such as the medical profession, require their members to receive a certain number of hours of continuing education over a certain time period, such as every year, or every two years. Professions which have mandatory continuing education for their members, also have compliance entities to certify that members complete the education requirement. The verification procedures followed by these compliance entities vary with the category of continuing education required. For some categories of continuing education, the verification procedure may simply entail showing proof of attendance at a seminar. Other categories of continuing education require a seminar attendee or material reviewer to complete a quiz to be graded by a certifying authority. The quiz serves as an indication that the professional has "materially participated" in the continuing education process.

The growth of the Internet has led to new methods of providing educational content to people. "Distance learning" or "remote education" are terms used to describe the provision of education over the Internet. Conventionally, distance learning providers receive certification from professional organizations, which allows them to provide continuing professional education, by maintaining a testing requirement for those types of education that require a professional to materially participate in the educational process. Unfortunately, the current testing component required by conventional continuing education providers is inefficient and unwieldy. A method is needed whereby compliance entities may be satisfied that professionals have materially participated in the continuing education process and yet does not require the professionals to undergo testing in order to prove that participation.

Moreover, professionals are often the target of on-line advertisers. The advertisers see the professionals as being more likely to have discretionary income with which to buy products. Accordingly, the advertisers place advertisements on web pages where the ads will be seen by the professionals. Unfortunately, advertisements become repetitive after being viewed multiple times and are therefore ignored. Ideally, advertisers seek to keep advertising content fresh for each user visit to a web site. Traditionally, the ability to distinguish between users visiting a web page has required resorting to privacy-intrusive methods such as cookies or user profiles. Cookies and user profiles are often disliked by web site users and their use may diminish the amount of traffic at a web site.

SUMMARY OF THE INVENTION

The illustrative embodiment of the present invention provides a method of delivering educational content over a network. The method of the present invention delivers educational content in a manner that satisfies the compliance entities of professional organizations tasked with the job of determining members compliance with continuing education requirements. Educational content is divided into topics and the topics are segregated or grouped into smaller educational units. The various educational topics are referenced on an initial web page run by the educational content provider. A professional visiting the initial web page selects an educational unit to review. Once selected, the professional may review the educational content subject to minimum and maximum time requirements designed to ensure participation in the education process. Failure to meet the minimum time requirement optionally results in a message to the professional that the professional needs to continue reviewing material in order to receive education credit that will satisfy the continuing education requirement. Failure to satisfy the maximum time requirement, i.e., exceeding the maximum time requirement, results in a message being sent to the professional that no educational credit will be granted for the review process.

The sequential nature of the educational content delivery used in the illustrative embodiment of the present invention also provides a method enabling advertisers to deliver sequential or periodic advertising to a user without using privacy-invasive methods. Advertisements are optionally indexed or associated with specific educational units. The advertisements are displayed when a professional returns to the initial web page run by the educational provider following review of an educational unit. Utilizing information regarding a professional's travel within the educational site the advertiser delivers advertising content that changes as the user completes the educational units of a particular topic. Specifically, the advertisement can be delivered in parts or units, each of which is associated with a particular one or group of educational units. Since most professionals complete an entire topic, the advertiser may be assured of repeat visits by the professional enabling the delivery of sequential advertising to the user. Hence, the advertisements can be conveyed to the user in multiple parts, thereby retaining the user's interest.

In one embodiment of the present invention, an educational provider provides access over a network to web pages containing educational content. An initial web page holds references to other web pages holding educational content. A web browser running on a client device makes a request for the initial web page which is then forwarded to the client device. A user of the client device indicates the educational unit the user is interested in and sends a request for that web page back to the educational provider. The educational provider forwards the requested web page back to the client device. The requested web page containing the educational content also contains an applet. The applet is executed as the web page is read by the web browser executing on the client device. The applet starts an internal clock, such as on the client device. When the user of the client device is done reviewing the educational content contained in the requested web page, the user indicates completion and the applet stops the internal clock. The amount of time that elapsed while the professional was reviewing the educational content is forwarded to the educational provider. The educational provider verifies that the elapsed time is greater than a minimum parameter and less than a maximum parameter. If the elapsed time satisfies the minimum and maximum time parameters, the user of the client device is sent a message indicating that they receive educational credit for their review of the educational unit.

In another embodiment, an educational provider provides access over a network to a plurality of web pages containing educational content for professionals. The educational content is grouped by topic and the topics are divided into separate educational units. Each educational unit is stored on a separate web page. An advertiser for the educational provider website provides a plurality of advertisements. An index on an initial web page of the educational site operated by educational provider links each individual educational unit to a distinct advertisement. When a user finishes a review of an educational unit and is returned to the initial web page, an advertisement linked (via the index) to the just reviewed educational unit is displayed. The linking of specific advertisements to specific educational units enables an advertiser to display sequential advertising to the same user over a period of time.

In a different embodiment, a web browser operating on an electronic client device interfaced with a network retrieves the initial web page of an educational provider's website. The initial web page contains references to other web pages containing educational content. A user of the electronic device selects and retrieves one of the other web pages containing educational content the user is interested in reviewing. When the retrieved web page holding the educational content is read by the web browser executing on the electronic client device, an applet located on the web page is executed. The applet on the retrieved web page starts an internal clock on the electronic client device which is used to track the elapsed amount of time that occurs while a user of the electronic client device reviews the educational content contained on the web page. Upon completion, the applet code stops the internal clock and determines the total elapsed time. When the user indicates completion of the reviewing process, the total elapsed time is forwarded to the educational provider. The elapsed time is checked against a minimum and maximum time parameter. If the elapsed time exceeds the minimum parameter and is less than the maximum parameter, the user of the electronic client device receives notice that educational credit has been granted for reviewing the educational content.

BRIEF SUMMARY OF THE DRAWINGS

FIG. 6 is a depiction of a graphical user interface used in an illustrative embodiment of the present invention at the end of the educational content review process.

DETAILED DESCRIPTION

Figure 1:
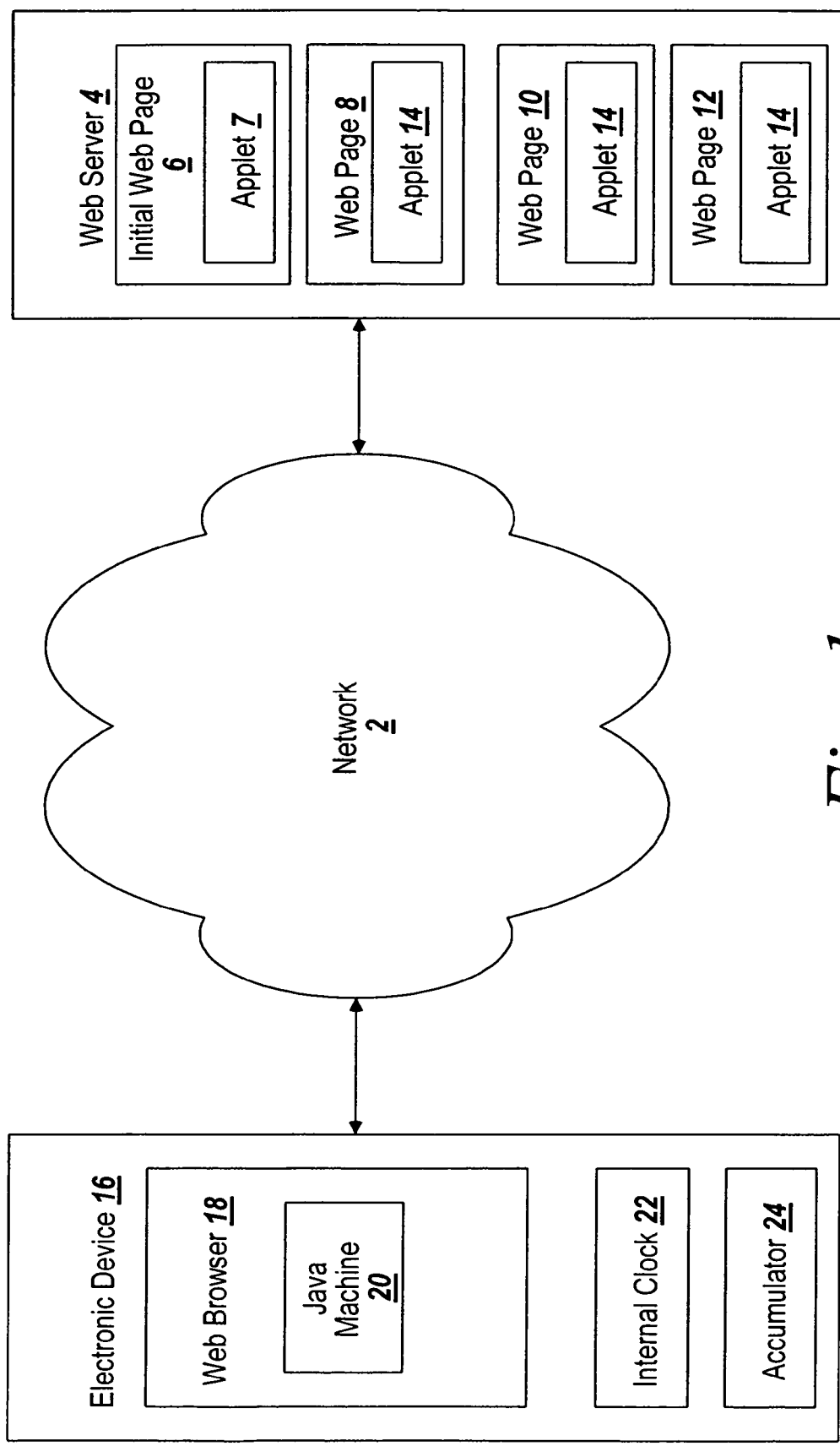
FIG. 1 depicts a network environment suitable for practicing an illustrative embodiment of the present invention.

Before we begin, we provide below some definitions.

The term professional is used herein to include, without limitation, any person whose professional work is based on a significant or specialized body of knowledge or work experience, such as attorneys, doctors, nurses, engineers, accountants, airplane pilots, factory workers, seamstresses, and the like. A non-professional is someone who is not considered to be a professional.

A network is a facility that interconnects a number of devices and provides a means for transmitting data from one attached device to another. The term network is used broadly herein and is used to refer to intranets, extranets, IP networks, and the like.

A page is a storage container/structure designed to hold content. A page designed to be accessed over the Internet is called a web page.

Content (educational content) refers to media content or data such as text, graphics, images and multi-media objects such as sound recordings and moving video clips, as well as executable content such as software code. The educational content may be displayed to a user in many different formats such as question and answers, puzzles, and other formats.

The term educational unit as used herein is intended to include content of an educational, advisory or explanatory nature, such as content directed to an educational topic. The educational unit is sized and arranged to be reviewed or studied by itself or in conjunction with other educational units. The educational units are substantially complete parcels of information or content that do not require referral to external resources. For example, the educational unit can contain information pertinent to a particular subject, such that when reviewed, conveys all necessary information for understanding the subject to the user. Alternatively, the educational unit can control the content size by providing links to other information. The use of links is intended to be encompassed by the educational unit, and still forms a complete content package. The educational units are considered capable of being received alone, and preferably content that is meaningful, beneficial or important to a user. The educational units may be sized for transfer to electronic devices with limited memory. One or more educational units may be combined to form a topic.

The term advertising unit as used herein is intended to include parcels of advertising content or information. The advertising unit can include a total, complete advertisement or part of an advertisement. If the educational unit includes only a part of an advertisement, the advertising unit can be viewed or associated with other advertising units, and particularly units that form a complete advertisement. The advertising unit, although complete, can also be viewed or associated with other units to form a larger advertisement or advertising topic. Hence, although each unit is a stand-alone, complete unit, it can be associated with other advertising units. According to one practice, an advertising unit can be indexed or associated with one or more educational units and displayed in connection therewith.

The term electronic device as used herein refers to devices capable of executing computer instructions, interfacing with the network, and in some embodiments possessing an internal clock. The electronic device may be a desktop computer system, personal digital assistant (PDA), handheld wireless device, cellular phone, pager, laptop or other similar device. A client device refers to an electronic device holding a subservient position in a distributed server-client relationship.

The illustrative embodiment of the present invention provides a method of delivering educational content over a network. The method of the present invention delivers educational content in a manner that satisfies continuing education compliance entities of professional organizations which are tasked with the job of determining member compliance with continuing education requirements. Educational content can be divided into topics and the topics can be segregated or grouped into smaller educational units so that professionals may study educational units of a manageable size. Topics are naturally occurring groupings of information recognizable to a professional in the field of study (as opposed to courses, which are collections of educational units assigned by an educational provider). The educational units are intended to include content of the type that is substantially complete so that it can be considered alone without needing to consider external resources by a professional or a non-professional. The educational unit can contain content that is meaningful or beneficial to the user. The term "meaningful" as used herein is used to convey the concept that the reviewed content is important to the particular user. Because the content of a single educational unit is complete, professional accrediting entities are willing to extend continuing education credit for reviewing single units. Since the educational units can be portions of a larger educational topic, there is an increased likelihood of repeat visits by professionals as the professionals endeavor to complete an entire topic. This likelihood of repeat visits allows an advertiser to deliver advertising in units over time as the user works their way through a topic. The ability to deliver advertising units or topics over time allows episodic or sequential advertising directed to repeat users, and preferably associated with related educational units.

The systems and methods of delivering educational content over a network discussed herein utilize electronic device applications which are known as web browsers. Web browsers, such as Netscape Navigator, from Netscape Communication Corporation, of Palo Alto, Calif., retrieve web pages and execute content (if any) contained in the web pages. The web pages are usually stored on a web server accessible over a network. The web pages are written in a markup language, such as the Hypertext Markup Language (HTML) or the Extensible Markup Language (XML) and contain information which is interpreted for display to a user by the web browser.

The majority of documents available on the Internet today are stored in HTML. HTML is a markup language that encodes a document via the use of tags and attributes. Tags appear between < > brackets, and attributes are specified in the form of "name=value". HTML specifies the meaning of each tag and attribute and how text located between tags and/or attributes will appear. An example is a tag <p> which designates the beginning of a new paragraph. A corresponding tag </p> designates the end of the paragraph. HTML documents are typically interpreted by HTML interpreters found in web browsers. Web browsers equipped with XML interpreters are required to translate and present web pages written in XML.

Conventionally, a user launches a web browser on a electronic client device in order to view web pages over a network. The web browser may be part of an application suite, such as Netscape Communicator, from Netscape Communications Corporation, or it may be a stand-alone application such as Netscape Navigator. The browser retrieves the web page, interprets it, and displays it to a user. While interpreting the web page, the browser may encounter an indication of an embedded "applet". The indication is a tag "<applet>". An "applet" is a program designed to be executed from within another application. Applets enable web pages to include advanced effects, such as moving graphics and sound. Applets may be written in a multitude of languages, but many applets are written in Java (Java is a trademark or registered trademark of Sun Microsystems, Inc. of Palo Alto, Calif. in the United States and in other countries). Java is an object oriented language specifically developed to provide cross platform capability. The Java software architecture is designed to support platforms ranging from personal computers to embedded network devices. Web browsers which are equipped with Java virtual machines (JVMs), can interpret the Java applets.

Once the web browser interpreter encounters a Java applet, the browser retrieves the code for the applet from an indicated source. The source for the applet may be the original location of the web page, which is often a web server. Alternatively, the source may be a different remote source accessible over the network for which a uniform resource locator (URL) address is provided. The retrieved code is fed to the JVM for execution. The result of the code execution may (in some instances) be shown by the web browser in the display presented to the user. This embedding of code enables whole programs to be included within a single web page merely by including a small applet to indicate the code source.

FIG. 1 depicts a network environment suitable for practicing an illustrative embodiment of the present invention. A web server 4 is interfaced with a network 2. The web server 4 includes an initial web page 6 which includes references to other web pages holding educational content 8, 10, and 12. The initial web page 6 includes an applet 7 which, when executed, retrieves the address of the site the web browser visited immediately prior to retrieving the web page. The retrieved web address is compared against the addresses of the other web pages holding educational content 8, 10, and 12. If the retrieved address matches the web address of one of the other web pages 8, 10, and 12, the address is cross-indexed against a list of advertisements to determine which advertisement unit to display to the user. The other web pages 8, 10, and 12 on the web server 4, include educational content and an applet 14 which causes a retrieving electronic client device to start an internal clock and track the amount of time a user of the electronic device spends reviewing the web page. Also interfaced with the network 2 is an electronic client device 16 including a web browser 18 with an associated Java Machine 20. The electronic device 16 may be a desktop computer system, PDA, handheld wireless device, laptop or other device possessing an internal clock and interfaced with the network 2. The electronic device 16 includes an internal clock 22 capable of independently tracking time, and an accumulator 24 capable of storing data such as the elapsed amount of time. The accumulator 24 may be located in any memory location accessible to the electronic device 16. Those of ordinary skill will readily recognize that the clock can be located anywhere in the network. The term clock as used herein is intended to include any structure capable of tracking or determining time. Those skilled in the art will recognize that the network 2 may include the Internet, a wide area network (WAN), a local area network (LAN) or some other type of network. The physical media used in the network may be telephone line, Ethernet cable, fiber-optic cable, or the network may be a wireless network.

Figure 2:
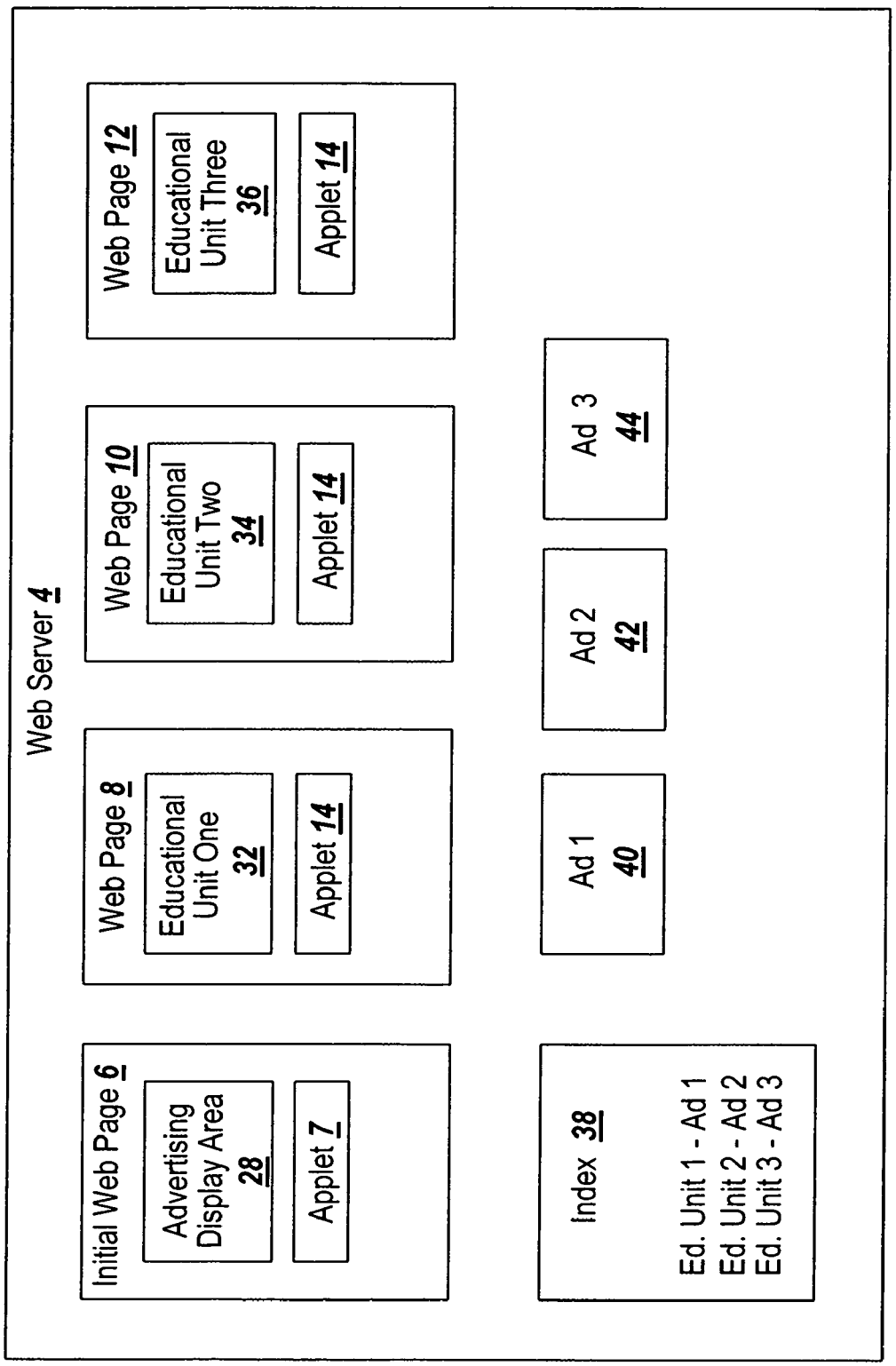
FIG. 2 depicts a block diagram of the website of an educational provider practicing an illustrative embodiment of the present invention.

The educational content which is retrieved for review is stored on web pages. FIG. 2 depicts a block diagram of an illustrative embodiment of the present invention which includes a web server 4 hosting a plurality of web pages holding educational content. The web server 4 includes an initial web page 6 and additional other web pages 8, 10, and 12 holding educational content 32, 34 and 36. The initial web page 6 acts as the entry into the educational website from locations outside the web server 4 and includes an advertising display area 28. The advertising display area 28 allows an advertiser to display an advertisement to the user of the electronic device 16 when the web page is retrieved via the web browser 18. Each of the web pages 8, 10, and 12 holding educational content 32, 34, and 36 include an applet 14 which is executed by the retrieving web browser 18 and causes the retrieving electronic device 16 to start its clock 22. The clock 22 is used to track the amount of time a user of the electronic device 16 takes to review the educational content 32, 34 and 36. The elapsed amount of time is used by the illustrative embodiment of the present invention to determine whether to grant continuing education credit from professional organizations and is discussed in more detail below. As noted above, when the initial web page 6 is retrieved by a user of an electronic device 16 and the applet 7 is executed, the applet on the initial web page determines whether the browser is retrieving the web page immediately after the user viewed an educational unit. If the previous address in the retrieving web browser 18 matches one of the web pages holding educational content 8, 10, and 12, the applet 7 consults an index 38 stored on the web server 4. The index 38 links an advertisement unit to one or more educational units. The advertisement units can be different for selected ones of the educational units. In some embodiments, the advertisements 40, 42, 44 are located on the web server 4. In other embodiments, the advertisements 40, 42, 44 may be located remotely to the web server 4 at a location accessible over the network. An advertisement linked to an educational unit is displayed on the advertising display area 28 on the initial web page 6. If the previous URL address of the retrieving web browser is not one of the other web pages 8, 10, and 12 hosted by the web server 4, a default advertisement is displayed in the advertising display area 28. Those skilled in the art will recognize that the index 38 may be stored either locally or at a remotely to the web server 4.

Figure 3:
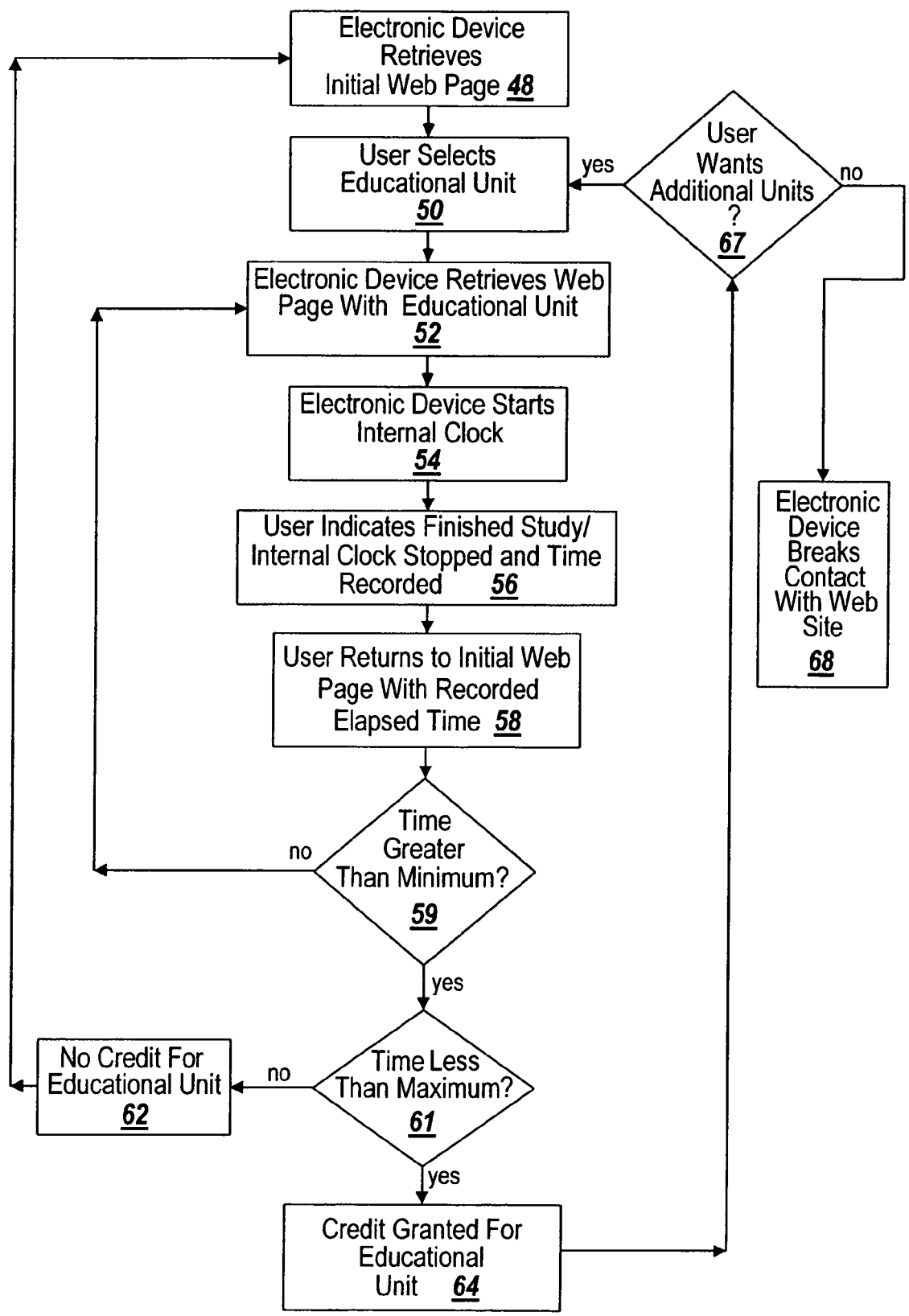
FIG. 3 is a flow chart of the sequence of steps followed by a user to review educational content in the present invention.

FIG. 3 depicts the sequence of steps followed in an illustrative embodiment of the present invention. The method begins when an electronic device retrieves the initial web page 6 stored on the web server 4 (step 48). The initial web page 6 includes links to other web pages 8, 10, and 12 which contain educational content 32, 34, and 36. The educational content 32, 34 and 36, on the web pages 8, 10 and 12, corresponds to individual educational units which constitute part of, or the entire topic. The user if desired, can select the educational unit they wish to review (step 50). The web page holding the educational unit is retrieved by the user via the network 2 (step 52). If the user desires to obtain educational credit from an accrediting entity, the user logs in via dialog boxes and a login button. The process of logging in starts an applet which in turn causes the electronic device 16 to start an internal clock (step 54). The start time is stored in an accumulator 24. Those skilled in the art will recognize that while Java applets are used for the purposes of illustrating the embodiments described herein, any sort of computer-executable code causing a retrieving electronic device to start and stop an internal clock would be sufficient for the purposes of the present invention. The user of the electronic device indicates they have finished reviewing the educational content contained in the retrieved web page by logging out via dialog boxes and a logout button. Those skilled in the art will recognize that other forms of graphical user interfaces or non-graphical based procedures may be used for the login and logout processes without departing from the scope of the present invention. The act of logging out causes the internal clock to stop. The stop time is compared against the start time to determine an elapsed time. The user returns to the initial web page (step 58) and the elapsed time amount is checked again a minimum time parameter stored on the web server 4 (step 59). If the elapsed time the user spent studying or reviewing the educational content does not exceed the minimum time parameter, the user is sent a message that further review is required and is returned to the educational unit web page (step 52). Any additional time spent reviewing the web page is tracked using the internal clock 22 and the accumulator 24. Subsequently, the user may again indicate the completion of their review and return to the initial web page (step 58). If the elapsed time is greater than the minimum time parameter (step 59) the accumulated time is checked against a maximum time parameter also stored on the web server 4 (step 61). If the user has exceeded the maximum time parameter the user of the electronic device 16 is sent a message indicating that no credit for their educational unit review will be granted (step 62) and the user of the electronic device is returned to the initial web page (step 48). If the elapsed time is greater than the minimum time parameter and less than the maximum time parameter (step 59 and step 61) the user is sent a message indicating that credit will be granted for the educational unit (step 64). The user of the electronic device 16 may wish to review more educational content (step 67), in which case the user will select an additional educational unit from the initial web page (step 50). If the user of the electronic device does not want to review additional educational content (step 67) the user clicks the appropriate graphical user interface on the initial web page 6 and the electronic device 16 breaks contact with the web server 4 (step 68). Those skilled in the art will recognize that the minimum and maximum time parameters may be stored in other locations than the web server 4 as long as the locations are accessible over the network 2.

The time parameters and educational unit size play a central role in the embodiments of the present invention. The minimum time parameter prevents a user of the electronic device from rapidly clicking their way through screens to satisfy an educational requirement. The maximum time parameter prevents a user from clicking on to a site and then turning their attention to other matters for extended periods of time before returning to their electronic device 16 and indicating that they had been studying for the entire time. The maximum time parameter combines with the division of educational topics into smaller educational units to help ensure that the user is actually at their electronic device or considering the displayed educational unit. The small size and completeness of the educational unit provides a means for the professional or non-professional to learn in a convenient time efficient environment over a day, or over many non-contiguous days throughout the course of a year, while concomitantly earning continuing education credit (in the case of the professional). It is this manner of verifying that users are materially participating in the educational process that allows accreditation authorities to extend continuing education credit without a testing requirement.

The educational units may be presented in many different formats to a user. In one format, the educational content 32, 34 and 36 is presented in the form of an interrogatory, such as "The Question of the Day". After a user has pondered the question for a sufficient amount of time, they may request the answer by clicking on a graphical user interface in order to be presented with the answer. Both the time spent reviewing the question and reviewing the answer are considered for accreditation purposes. A significant advantage of providing the posted educational content in a question format, is that it allows the user to consider the appropriate response to the question, in order to invoke a thoughtful response to the posted question. Another significant advantage of the educational content format of the invention is that it can be divided into independent and separate discrete educational units, in the form of a question and corresponding answer, which can form part of a larger set of questions or complete educational units, to form a course. However, the completeness of each educational unit still provides meaningful educational content to the user who does not wish or desire to take the entire course.

The structure of each question and answer offers a subtle means of teaching. Each question and answer is written to appeal, for example to all levels of professional and non-professionals, such as the junior doctor, lawyer, commercial airline pilot, as well as the seasoned expert in each specialty. For example, in an educational unit on Anesthesiology, the daily question and answer typically is structured so that the beginning answer(s) contain(s) basic keywords and definitions. These keywords and definitions comprise a significant portion of the American Board of Anesthesiologists Specialty Examination for board certification. As a result, the junior resident learns and is interested by the question and answer format, since it provides a complete content package without necessitating reference to external resources. To educate the seasoned clinician, the question and answer typically concludes with a comparison of studies, a counter-intuitive fact, or a recent study questioning, augmenting, or updating traditional teaching. As such, each educational unit, due to its complete structure, is a valuable educational and advertising tool to interest the brand-new clinician through the seasoned professor.

The educational units can include, for example, a questions and answers format designed to cover content of a specialty or sub-specialty and can employ specific keywords for that specialty, as a guide to subject areas. Each question and answer (e.g., unit) is a stand-alone informational unit of value. However, the sum of the units is of additional value, since the sum of the parts can comprise a review course in a particular specialty, thereby earning additional continuing education credit. As such, stand-alone information (such as a daily Question of the Day) is packaged, over time, to create an added value. The daily question and answer are not created by simply dividing up lectures, video presentations or the like. Each days question and answer is a unit of meaningful complete informational content that can stand alone as a valuable educational tool. The units are also configured so that when grouped, they create a review course in a medical or other specialty or area, covering the content as so prescribed by the specialty board of that specialty (if applicable).

In another embodiment, the educational content may be presented in the form of a crossword puzzle. The crossword puzzle or similar "game" is available every day of a week (or other time interval) and corresponds to that week's educational format or syllabus (or other part of the syllabus). As the week progresses, the clues to the crossword puzzle become active links (hyperlinks) to the appropriate day's questions and answers. As such, a reader trying to complete the daily portion of the puzzle, when "stuck", clicks on the available link to the answer. The puzzle feature also leads to many reader's recruiting the assistance of their colleagues in an effort to solve the puzzle. This serves as a subtle, yet significant novel and unique advertising method for the educational site. Readers can use their personal password and personal page, so that the answers completed are held in their personal puzzle(s) and the user can later retrieve in the puzzle. Completed puzzles can also be used as verification of site usage for credit. This interactive game feature encourages a user to continually access the educational system to review the educational content or to complete the educational game. This multiple return usage feature or requirement allows the user's performance and habits to be tracked. The information attained from this tracking can be employed to tailor advertising more specifically to the individual user, or to expose the user more frequently to the sponsor's advertisements or advertising units.

Since the method of the present invention allows interested users to return to the site to participate in any selected number of educational units (e.g., questions), the web page can display advertising programs where the advertising sponsor can also meter or parcel the advertisement over any selected period of time in the form of advertising units. For example, the system can dispense the advertising units in parcels of information over days to months, as a result of being coupled to a particular one or group of educational units.

A different embodiment may present the educational content in outline form with hyperlinks to other web pages. Nonetheless, each educational unit still forms a unit having stand-alone, complete, self-contained content. Those skilled in the art will recognize that there are a number of different ways to present educational content to a user that are encompassed by the present invention, and that the educational content for a single educational unit is not necessarily restricted to being located on a single web page.

The educational content and web page advertisements may be sent to another professional or non-professional in order to expand the number of users reviewing and receiving the educational content. The method of the present invention affords the user the ability to forward advertising content in addition to the educational content to a number of different people. A graphical user interface on one of the web pages holding educational content allows a user to forward the web page (content and advertising) to another electronic device. The size of the educational unit facilitates the dissemination thereof to the device. If the educational content and accompanying advertisement are sent by electronic mail, the recipients email address may be recorded and stored for later use.

The division of educational topics into smaller educational units stored on separate web pages affords the advertisers on an educational website greater flexibility. The advertisers may present sequential advertisements to users of the website with the knowledge that the website users are likely to return for additional educational units. In other words, if an educational topic has been split into multiple educational units, it is likely that the user reviewing the educational content will return to the website multiple times in order to review all of the educational content for the particular topic. Because the user repeatedly returns to review the web page content, the system can display the advertising units in a sequential manner.

The relatively small size of the educational units has the additional benefit of enabling transfer of the web pages holding educational content to small capacity client devices. Client electronic devices which are able to interface with the network 2 are able to download educational units even if they have limited memory storage space available. Advertisements are limited to a certain size to maintain this benefit. Thus handheld and other wireless devices may be utilized in the present invention.

Figure 4:
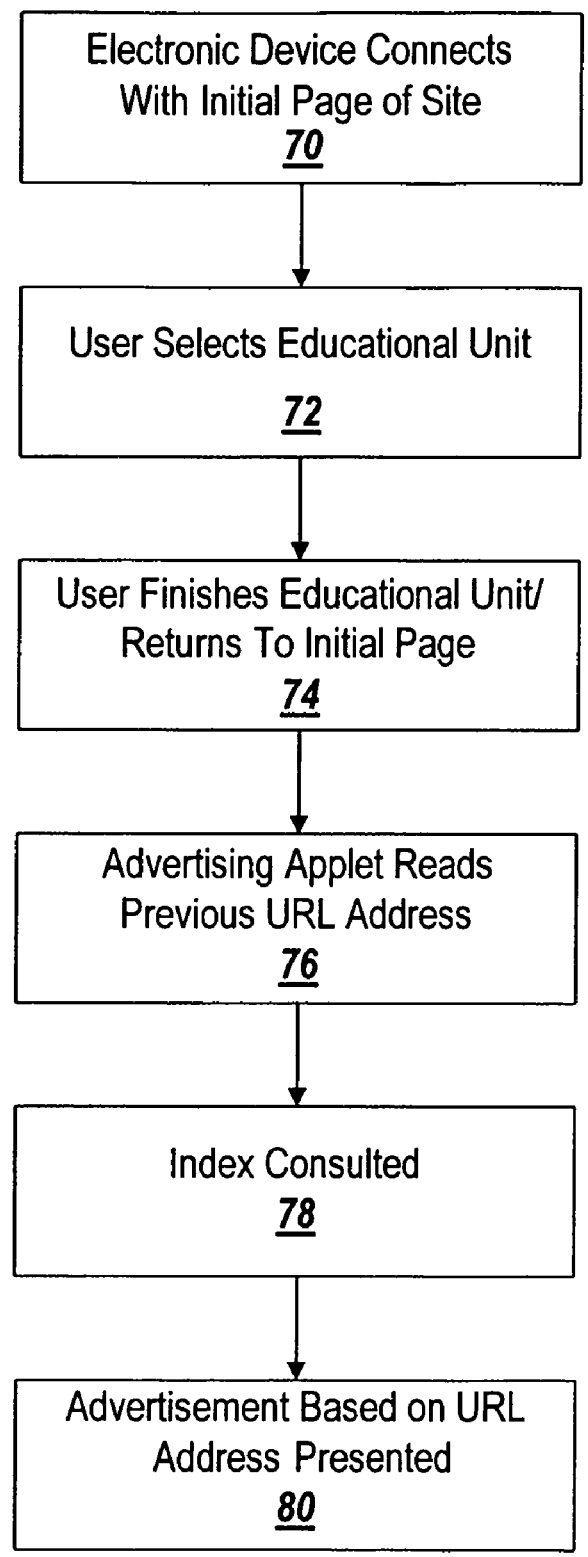
FIG. 4 is a flow chart of the sequence of steps of a method of providing sequential advertising in an illustrative embodiment of the present invention.

FIG. 4 depicts a flow chart of the sequence of steps by which an advertiser on an educational website is able to present sequential advertisements. The user of an electronic device 16 retrieves an initial web page 6 of an educational site (step 70). The user of the electronic device 16 selects an educational unit to review (step 72). When the user finishes reviewing the educational unit, the user is returned to the initial web page (step 74). An applet 7 stored on an initial web page 6 reads the previous URL address of the web browser 18 to determine where the web browser has been immediately prior to the initial web page (step 76). If the previous URL address retrieved from the web browser 18 indicates that the user of the web browser has just finished visiting a web page holding an educational unit, the URL address is reconciled against an index 38 which cross references educational units with specific ads (step 78). An advertisement based on the educational unit just reviewed is then displayed to the user (step 80).

Figure 5:
FIG. 5 is a depiction of a graphical user interface used in an illustrative embodiment of the present invention at the beginning of the educational content review process.

In one embodiment, when a professional wishes to receive educational credit for reviewing educational content the user logs in using dialog boxes and a login button on a retrieved web page. The login button starts an internal clock on the electronic device which is used to track elapsed time. A logout button stops the clock. An applet on the web page reports the accumulated time to the educational provider for the determination as to whether applicable time parameters have been met. FIG. 5 depicts a web page including dialog boxes 81 for a Username and Password, and a login button 82. FIG. 6 depicts a web page including dialog boxes 85 for a Username and Password and a logout button 86.

In an illustrative embodiment of the present invention, a search method is provided for the education content listed in the various educational units. The initial web page 6 employs content arranged in a selected manner that enables a user to search through stored web pages 8, 10 and 12 based on particular user-defined content. For example, the user may search educational units based on the profession of the authors of the educational unit. The search may include dates that allows a user to define particular start and end dates between which a search can be conducted. Alternatively, the search may be made by a particular specialty area, or question category. Particular search boxes may be used to allow a user to define a syllabus topic, a question content, an answer content, or a reference content.

The user may also search an archive of previous questions by topic, text in the question or answer, or by the references. The search also allows the user the ability to broaden a search to retrieve questions and answers from other educational units stored on other web page. For example, an obstetrician interested in a disease may be interested in the anesthetic implications of this disease. The user can search for a selected key word on multiple specialty sites (selectable by the user) without navigating to other web sites (e.g., URL addresses). This search feature enables the user to seek data usually directed at other professionals whenever necessary.

In one embodiment, the educational system disclosed herein generates an educational content inquiry at a selected, pre-determined, or random frequency. According to one practice, the educational system can create a daily inquiry that provides for (1) educating professionals and students, (2) separate and distinct educational parcels or units, and (3) supplying continuing education to professionals and non-professionals. The discrete educational units can be compiled or combined to form a course of selected length and duration.

If a user desires to complete a course, which is comprised of a selected number of educational units, the user must complete at least a selected number of the total number of educational units. The user's participation in the course, the frequency and duration of visits, as well as other user and system parameters, may be used to determine when and if the user completes the course. The user may be notified when the appropriate number of educational sub-units are completed. The reader may then be notified that if he or she submits payment, he or she will receive credit for a number of hours of continuing education credit. This is a novel educational means of supplying continuing education credit in daily parcels (contiguous or not) and a novel business means of inducing a reader to pay for something of significant value for that reader, that he or she has already earned but is under no obligation to pay for.

Each educational unit may be a stand-alone informational unit of value. However, the educational sub-units may be cumulatively employed to add or create additional value, since the sum of the parts comprises a review course for which credit can be allotted. As such, stand-alone information (daily Question of the Day) is packaged, over time, to create an added value. The daily educational content question and answer are not created by simply dividing up lectures, video presentations or the like. Each educational content question and answer is a parcel of information that can stand alone as a valuable educational tool. However, the parcels are so designed, that when grouped, they create a review course in a particular specialty.

Each educational unit may be configured to appeal both to professionals or non-professionals. The content may be structured so that the initial answers to the questions contains basic keywords and their definitions, which can be utilized by the user when studying or training to pass selected certifications or examinations. On the other hand, the questions may appeal to the more experienced professional by employing content directed to a comparison of studies, a counter-intuitive fact, or a recent study questioning, augmenting, or updating traditional teaching. As such, each educational unit due to its internal structure is a valuable educational and advertising tool that is focused and interesting to professionals of all levels and to non-professionals.

In one embodiment of the present invention, using the educational unit question and answer format, the user may supply answers to the daily question. The user's answers may be used to generate a user profile that is updated periodically, giving that user immediate feedback regarding performance. This educational model allows the user to focus attention on specific weaknesses or strengths. The educational units may be altered based on the user profile.

In an embodiment of the present invention, user-provided information is used to shape the content of subsequent educational units. A user completing an educational unit may respond via a dialog box or other graphical user interface about the just completed unit. The educational unit author may take this user-provided information into account for subsequent educational units. This prompt effect on course curriculum is absent in many continuing education programs.

It will thus be seen that the invention attains the objects made apparent from the preceding description. Since certain changes may be made without departing from the scope of the present invention, it is intended that all matter contained in the above description or shown in the accompanying drawings be interpreted as illustrative and not in a literal sense. Practitioners of the art will realize that the network configurations depicted and described herein are examples of multiple possible network configurations that fall within the scope of the current invention. The network configurations are intended to be illustrative and not definitive. Likewise, the sequence of steps utilized in the illustrated flowcharts are examples and not the exclusive sequence of actions possible with the present invention.

We claim:

1. A computer-readable medium holding computer-executable instructions that when executed cause a computing device to:

transmit a search request from a user for educational content over a network;

send a request from the user for a page having educational content over the network based on a search result generated in response to the search request, the search result referencing the requested page;

receive said page;

display the content to the user;

identify an elapsed time during which the user views the educational content to ensure said user views said content for a time greater than or equal to a minimum time period and less than or equal to a maximum time period, the elapsed time tracked locally by an executable process on the computing device;

forward the identified elapsed time to a remote location; and receive an indication of continuing education credit being awarded to the user, the continuing education credit awarded for viewing the educational content where said identified elapsed time is between said maximum and said minimum time periods.

2. The medium of claim 1 wherein said educational content is presented to a user in the form of a daily interrogatory and related answer.

3. The medium of claim 1 wherein the instructions further cause the computing device to:

record the amount of credit granted to each user; and display the amount of credit granted to each user to said user upon request.

4. The medium of claim 1 wherein educational credit is not awarded to a user of said electronic device for reviewing said educational content as a result of the recorded amount of time exceeding a maximum time parameter.

5. The medium of claim 1 wherein the instructions further cause the computing device to: display a received message to the user that indicates an inadequate amount of time has been spent reviewing said educational content, said message generated as a result of the recorded amount of time not exceeding a minimum time parameter;

identify subsequently a new recorded elapsed amount of time for said user; and display an indication of an awarding of educational credit to the user based on said new recorded amount of time.

6. A computer-readable medium holding computer-executable instructions that when executed cause a computing device to:

receive a search request from a user for educational content over a network;

provide a search result to the user in response to the search request;

receive a request from the user over the network for a page having educational content divided into one or more educational units, the page referenced in the search result;

send said page and an executable process to the user, the executable process identifying an elapsed time during which the user views the educational content to ensure said user views said content for a time greater than or equal to a minimum time period and less than or equal to a maximum time period, the elapsed time tracked locally by the executable process at the location to which the educational content was sent;

receive the identified elapsed time at the location from which the educational content was sent; and transmit to the user an indication of the granting to the user of continuing education credit for viewing the educational content where said identified elapsed time is between said maximum and said minimum time periods.

7. The medium of claim 6, wherein the instructions further cause the computing device to:

associate one or more advertising units with one or more of said educational units such that said advertising unit is viewed in connection with said educational unit.

8. The medium of claim 7 wherein a plurality of said advertising units constitute an advertisement.

9. The medium of claim 7 wherein said advertising units are indexed to said educational units.

10. The medium of claim 7 wherein said advertising units displayed are specific to the user.

11. The medium of claim 7 wherein said advertisement is part of a sequence of advertising, said sequence of advertising being synchronized with the sequence of educational units.

12. The medium of claim 7 wherein the instructions further cause the computing device to:

forward said educational unit and an associated advertisement to a user-designated recipient.

13. A computer-implemented method comprising:

receiving a search request from a user for educational content over a network;

providing a search result to the user in response to the search request;

receiving a request from the user over the network for a page having educational content divided into one or more educational units, the page referenced in the search result;

sending said page and an executable process to the user, the executable process identifying an elapsed time during which the user views the educational content to ensure said user views said content for a time greater than or equal to a minimum time period and less than or equal to a maximum time period, the elapsed time tracked locally by the executable process at the location to which the educational content was sent;

receiving the identified elapsed time at the location from which the educational content was sent; and transmitting to the user an indication of the granting to the user of continuing education credit for viewing the educational content where said identified elapsed time is between said maximum and said minimum time periods.

14. The method of claim 13, further comprising:

associating one or more advertising units with one or more of said educational units such that said advertising unit is displayed in connection with said educational unit.

15. The method of claim 14 wherein said educational unit includes content for a professional user and a non-professional user.

16. The method of claim 14 comprising the additional steps of:

grouping selected educational units so as to form a course;

registering said user for said course; and sending said educational units forming said course to said electronic device for review by said user.

17. The method of claim 14 comprising the additional steps of:

providing user response to the author of said educational units after said user reviews said educational units; and altering other educational units based on said user response.

18. The method of claim 14 comprising the additional steps of:

presenting said educational unit to said user in the format of a crossword puzzle;

providing hyperlinks to the correct answers for said crossword puzzle; and using said crossword puzzle completion as a basis for awarding continuing education units to said user.

19. The method of claim 14 comprising the additional step of:

providing a search feature for said educational unit, said search feature searching multiple educational units on a plurality of web pages utilizing a single query.

* * * * *